(12) United States Patent
Muehlenbrock et al.

(10) Patent No.: US 11,458,924 B2
(45) Date of Patent: Oct. 4, 2022

(54) VEHICLE SEAT

(71) Applicant: ADIENT ENGINEERING AND IP GMBH, Burscheid (DE)

(72) Inventors: Ludger Muehlenbrock, Recklinghausen (DE); Toralf Mueller, Leverkusen (DE)

(73) Assignee: Adient US LLC, Plymouth, MI (US)

( * ) Notice: Subject to any disclaimer, the term of this patent is extended or adjusted under 35 U.S.C. 154(b) by 87 days.

(21) Appl. No.: 16/978,824

(22) PCT Filed: Apr. 2, 2019

(86) PCT No.: PCT/EP2019/058304
§ 371 (c)(1),
(2) Date: Sep. 8, 2020

(87) PCT Pub. No.: WO2019/193008
PCT Pub. Date: Oct. 10, 2019

(65) Prior Publication Data
US 2021/0046892 A1 Feb. 18, 2021

(30) Foreign Application Priority Data

Apr. 5, 2018 (EP) ..................... 18165911

(51) Int. Cl.
| | |
|---|---|
| *B60R 21/217* | (2011.01) |
| *B60N 2/68* | (2006.01) |
| *B60R 21/207* | (2006.01) |
| *B60R 21/264* | (2006.01) |

(52) U.S. Cl.
CPC .............. *B60R 21/217* (2013.01); *B60N 2/68* (2013.01); *B60R 21/207* (2013.01); *B60R 21/264* (2013.01)

(58) Field of Classification Search
None
See application file for complete search history.

(56) References Cited

U.S. PATENT DOCUMENTS

| | | | |
|---|---|---|---|
| 6,089,594 A | * 7/2000 | Hasegawa | ................ B60N 2/42 |
| | | | 280/730.2 |
| 6,561,540 B1 | 5/2003 | Hasegawa et al. | |
| 10,239,430 B2 | * 3/2019 | Kalinowski | ............. B60R 21/21 |
| 2017/0057448 A1 | 3/2017 | Jaradi et al. | |

FOREIGN PATENT DOCUMENTS

| | | |
|---|---|---|
| DE | 102017120434 A1 | 3/2018 |
| EP | 0788941 A2 | 8/1997 |
| FR | 2924992 A1 | 6/2009 |

(Continued)

OTHER PUBLICATIONS

European Patent Office, Search Report issued in EP Application No. 18165911.1, dated Sep. 13, 2018, 8 pages, European Patent Office, Munich, Germany.

(Continued)

*Primary Examiner* — Faye M Fleming
(74) *Attorney, Agent, or Firm* — Marshall & Melhorn, LLC

(57) ABSTRACT

A vehicle seat may have a seat part and a backrest. At least the seat part or the backrest may have a frame. The frame may have at least one frame side part. The frame side part may have an embossing for attaching a gas pressure generator for an airbag.

13 Claims, 5 Drawing Sheets

(56) References Cited

FOREIGN PATENT DOCUMENTS

Figure 1:
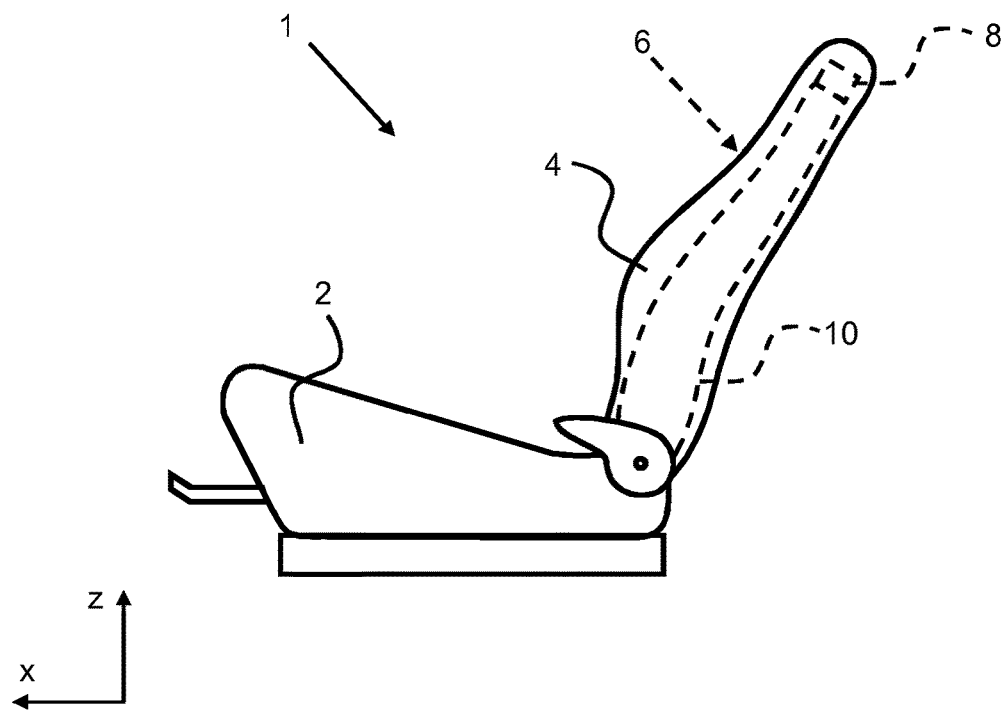

FR 3005009 A1 * 10/2014 .............. B60N 2/68
GB 2296476 A 7/1996

OTHER PUBLICATIONS

European Patent Office, International Search Report with Written Opinion issued in PCT/EP2019/058304, dated Jun. 27, 2019, 13 pages, European Patent Office, Rijswijk, Netherlands.
The International Bureau of WIPO, International Preliminary Report on Patentability, issued in PCT/EP2019/058304, dated Oct. 6, 2020, 15 pages, The International Bureau of WIPO, Geneva, Switzerland.

* cited by examiner

VEHICLE SEAT

The invention relates to a vehicle seat, in particular a motor vehicle seat, having a seat part and a backrest, at least the seat part or the backrest having a frame, the frame comprising at least one frame side part.

PRIOR ART

Vehicle seats are currently provided with integrated safety features for the protection of the vehicle occupant. Vehicle seats have to be configured in such a way that the vehicle seat is structurally sound and provides the support which is necessary for a vehicle occupant. In order to improve the safety features of a vehicle seat, an airbag can be installed into the vehicle seat construction. If an airbag is integrated into the vehicle seat construction, the vehicle seat has to make an appropriate deployment of the airbag possible.

DE 10 2017 120 434 A1 relates generally to a vehicle seat assembly and, in particular, to a fastening architecture and energy transmission construction for the control of a side airbag deployment on the backrest of the vehicle seat assembly.

Problem

The invention is based on the problem of improving a vehicle seat of the type mentioned at the outset, in particular of improving a vehicle seat which makes simpler and more space-saving mounting of a gas pressure generator and/or an airbag module possible.

Solution

According to the invention, said problem is solved by way of a vehicle seat, in particular a motor vehicle seat, having a seat part and a backrest, at least the seat part or the backrest having a frame, the frame comprising at least one frame side part, the frame side part having a stamped portion for fastening a gas pressure generator for an airbag.

By virtue of the fact that the frame side part has a stamped portion for fastening a gas pressure generator for an airbag, the number of required further parts for mounting the gas pressure generator can be reduced. Furthermore, as a result, time can be saved in the case of the mounting of the gas pressure generator and, in addition, it can be ensured that the gas pressure generator is installed correctly.

Advantageous refinements which can be used individually or in combination with one another are described in the following text.

The frame can be the loadbearing structure of the backrest or of the seat part. The frame side part can be a constituent part of a frame which is installed in the backrest. The frame side part can be a constituent part of a frame which is installed in the seat part. The airbag can be a side airbag which is arranged in the backrest. The airbag can be a side airbag which is arranged in a side bolster of the seat part. The vehicle seat can have a frame with merely one frame side part which is provided according to the invention with a stamped portion. The vehicle seat can have a frame with on both sides in each case one frame side part which is provided according to the invention with a stamped portion.

The stamped portion can comprise a first section and a second section. The second section can be arranged adjacently with respect to the first section. The first section and the second section of the stamped portion can be stamped inward and stamped outward, respectively, in an opposed direction substantially parallel to the transverse direction. The first section can be stamped, in particular, in the direction of a frame interior. In particular, the first section of the stamped portion is stamped inward in the direction of a second opposite seat frame side part of the frame. The second section can be stamped, in particular, in the direction of a frame exterior. In particular, the second section of the stamped portion is stamped outward away from a second opposite seat frame side part of the frame. A passage opening can be arranged in a transition region between the first section of the stamped portion and the second section of the stamped portion.

At least one through bore can be arranged in the region of the first section. A plurality of through bores, in particular at least two through bores, are preferably arranged in the region of the first section. The through bores which are arranged in the region of the first section are arranged, in particular, next to one another and parallel to a longitudinal extent of the stamped portion. The at least two through bores can serve to position the gas pressure generator and/or an airbag module in a variable manner relative to the frame side part. The at least two through bores can make a use of gas pressure generators of different length possible.

The gas pressure generator can have means for fastening to the frame side part. The gas pressure generator can be plugged at least in sections into the frame side part. The gas pressure generator can be clipped to the frame side part. The gas pressure generator can have a hook-shaped lug which can be plugged into a through bore. The gas pressure generator can have a threaded bolt which projects, in particular, perpendicularly from a housing of the gas pressure generator. The gas pressure generator can be capable of being fastened to the frame side part by means of the threaded bolt. The threaded bolt of the gas pressure generator can be guided through at least one through bore of the frame side part for mounting purposes. The threaded bolt of the gas pressure generator can be capable of being fixed on the frame side part by means of a nut.

The stamped portion preferably has a width so as to receive the gas pressure generator at least partially, preferably at least halfway, in the stamped portion.

The vehicle seat can be arranged in the back of a vehicle.

FIGURES AND EMBODIMENTS OF THE INVENTION

Before refinements of the invention are described in the following text in greater detail on the basis of drawings, it is first of all to be noted that the invention is not restricted to the described components or the described method steps.

Furthermore, the terminology which is used also does not represent a restriction, but rather merely has an exemplary character. In so far as the singular is used in the following text in the description and the claims, the plural is in each case also included here unless the context rules this out explicitly.

Figure 2:
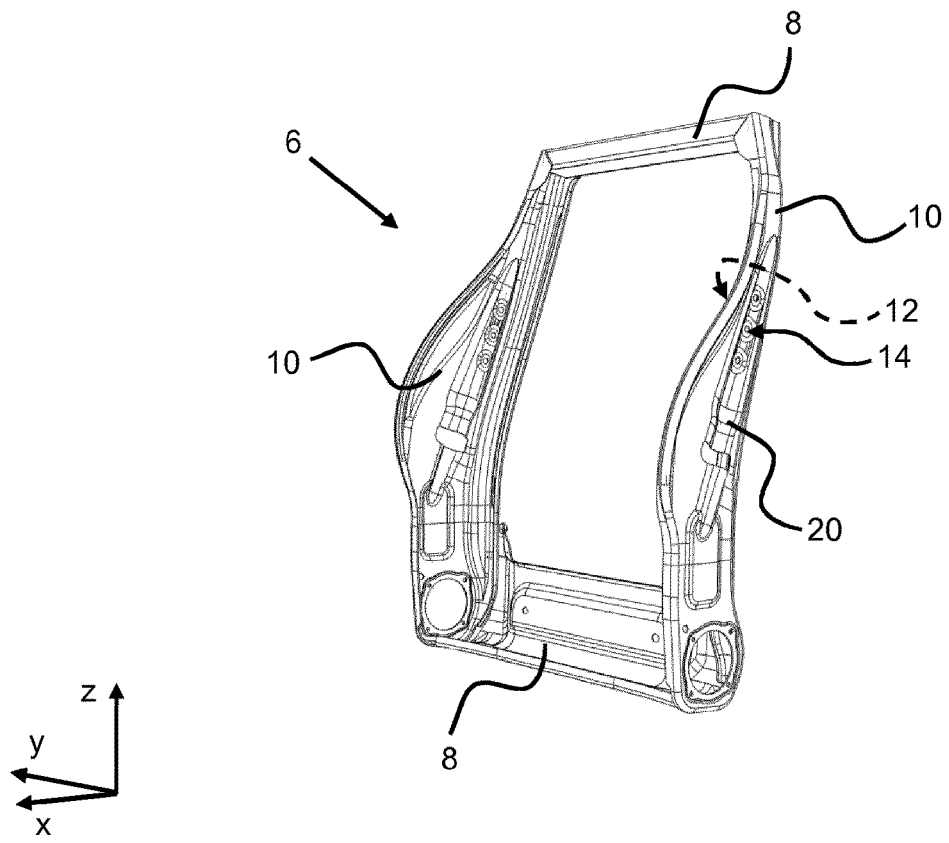
Figure 3:
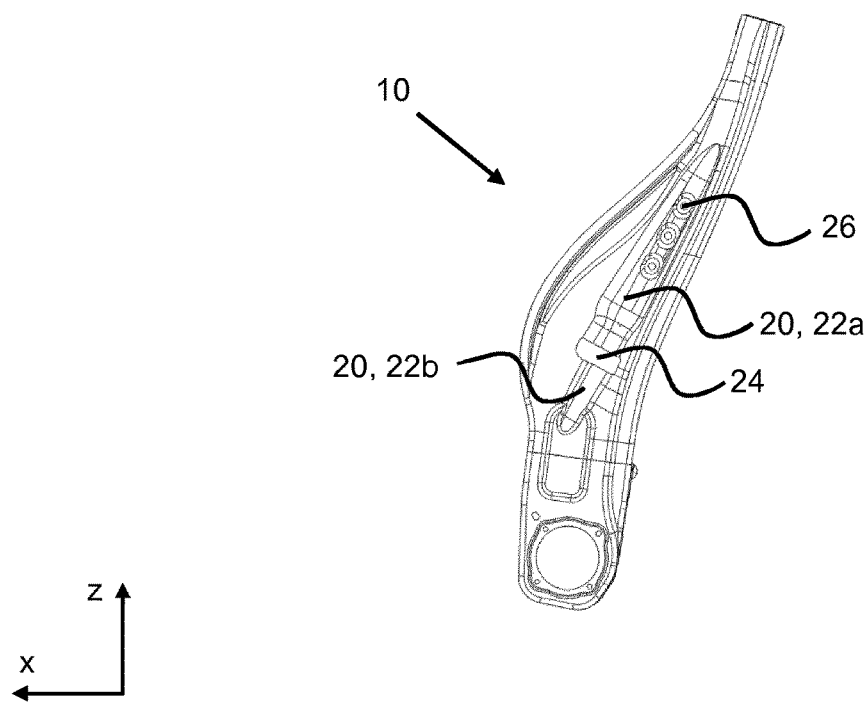
Figure 4:
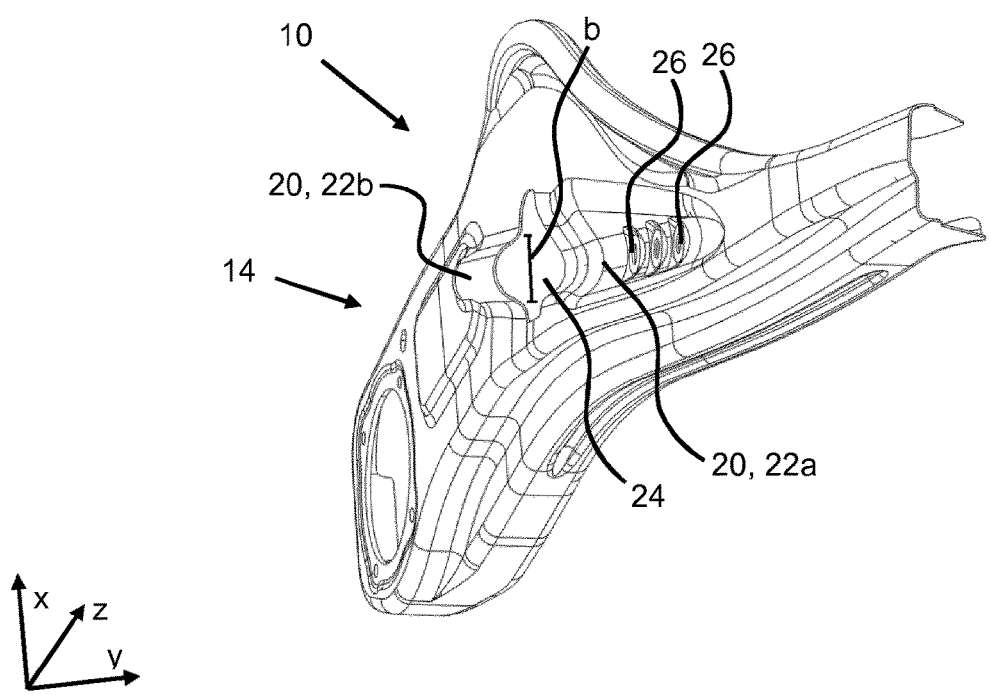
Figure 5:
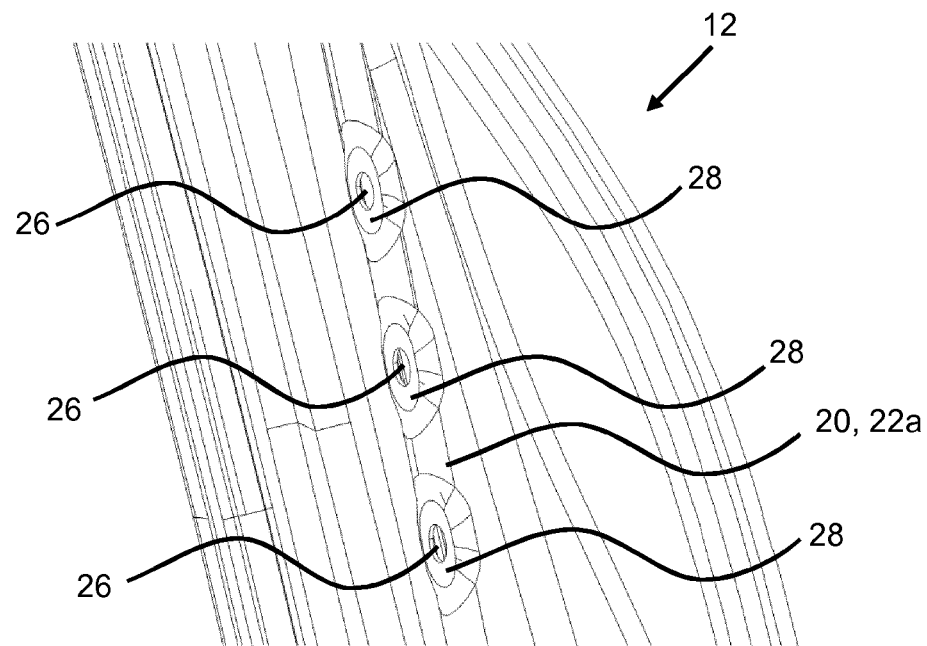
Figure 6:
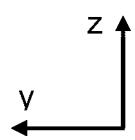
Figure 6:
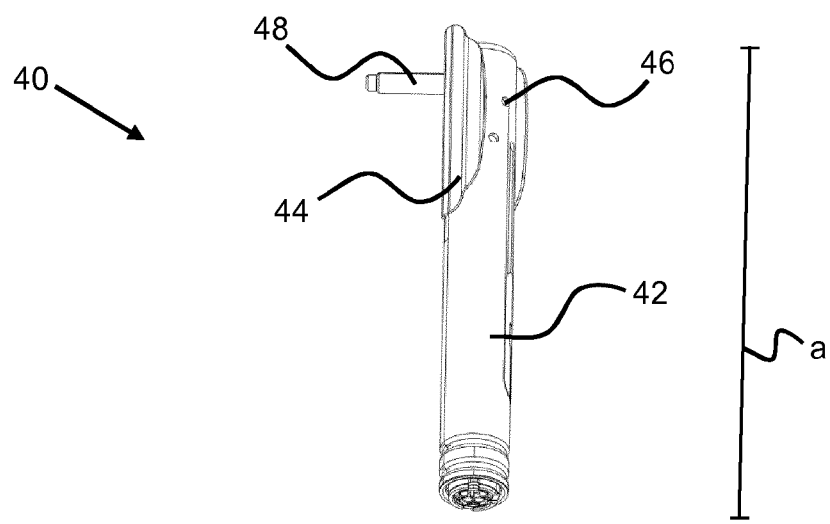
Figure 7:
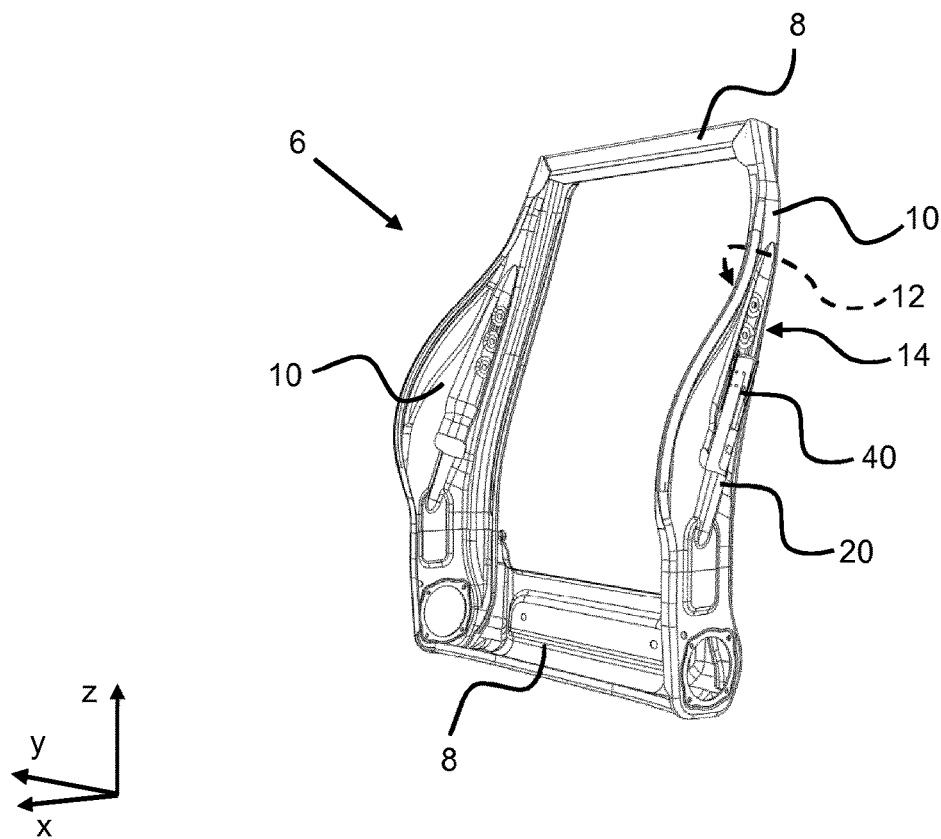
Figure 8:
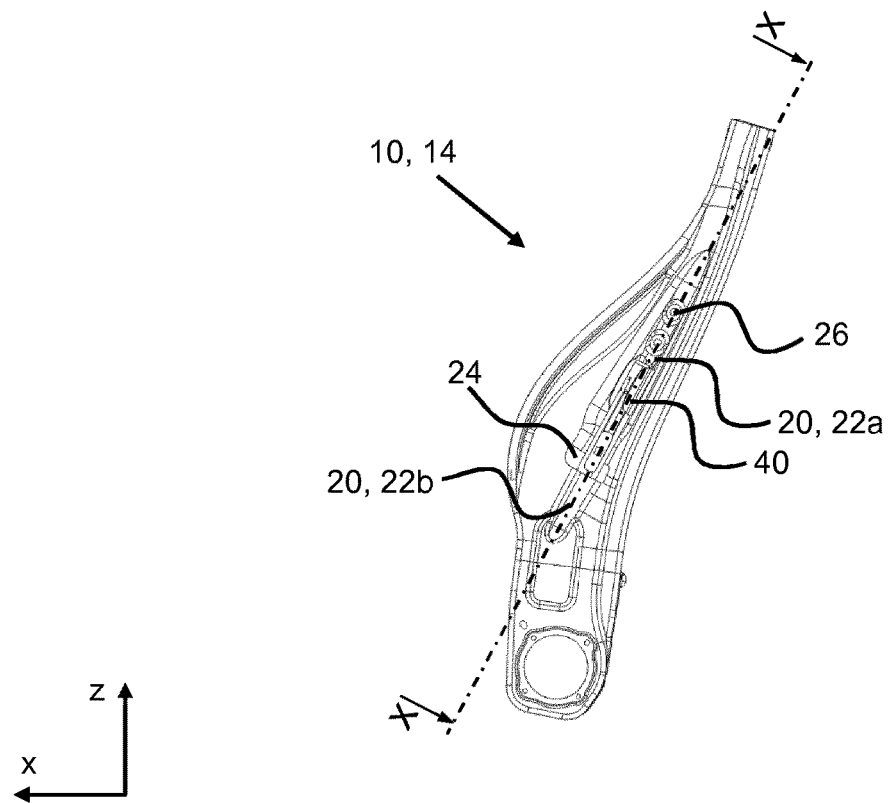
Figure 9:
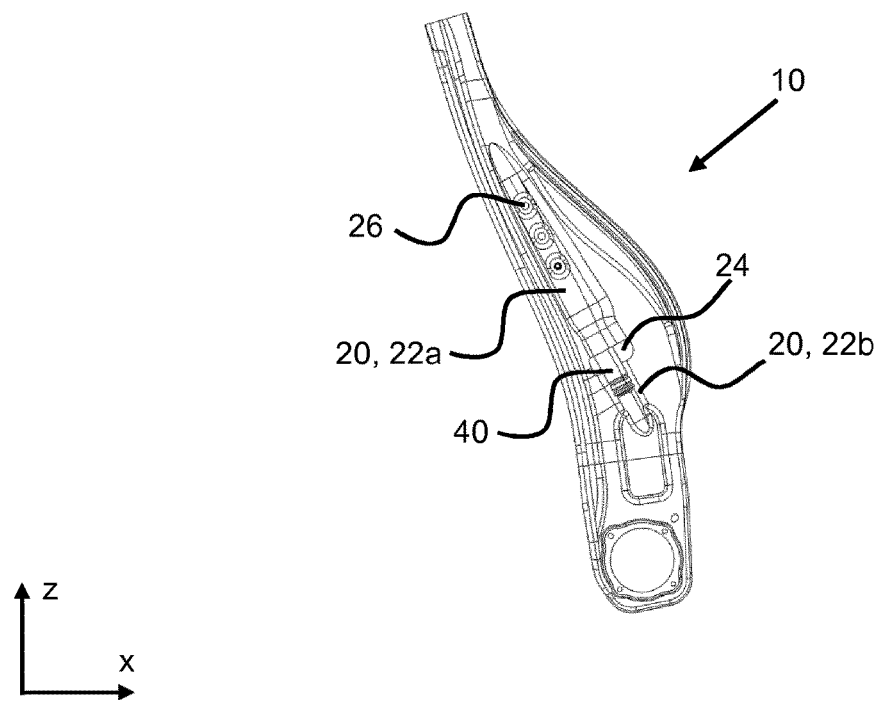
Figure 10:
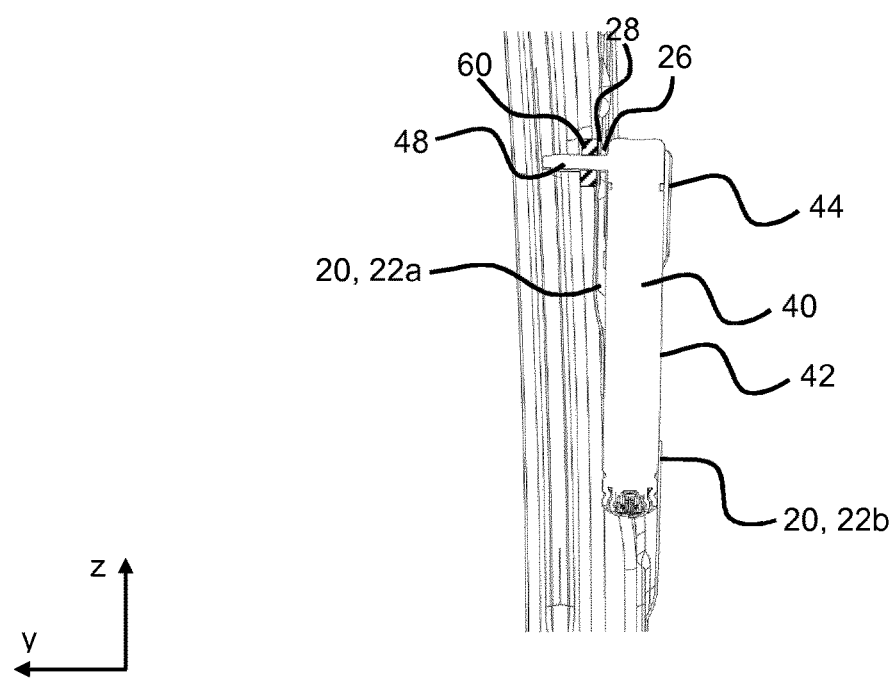

In the following text, the invention is described in greater detail on the basis of one advantageous exemplary embodiment which is shown in the figures. The invention is not restricted, however, to said exemplary embodiment. In the figures:

FIG. 1 diagrammatically shows a vehicle seat,

FIG. 2 shows a perspective illustration of a frame of a backrest,

FIG. 3 shows a side view of an outer side of a frame side part of the frame from FIG. 2, FIG. 4 shows a perspective view obliquely from above of the frame side part from FIG. 3, FIG. 5 shows an enlarged view of an inner side of the frame side part from FIG. 3, in the region of through bores, FIG. 6 shows an illustration of a gas pressure generator, FIG. 7 shows a perspective illustration (corresponding to FIG. 2) of the frame with a mounted gas pressure generator, FIG. 8 shows a side view (corresponding to FIG. 2) of the outer side of the frame side part with a mounted gas pressure generator, FIG. 9 shows a side view of an inner side of the frame side part from FIG. 8, and FIG. 10 shows a sectional illustration along the line X-X from FIG. 8.

The vehicle seat 1 which is shown diagrammatically in FIG. 1 will be described in the following text with the use of three spatial directions which run perpendicularly with respect to one another. In the case of a vehicle seat 1 which is installed in the vehicle, a longitudinal direction x runs largely horizontally and preferably parallel to a vehicle longitudinal direction which corresponds to the customary travel direction of the vehicle. A transverse direction y which runs perpendicularly with respect to the longitudinal direction x is likewise oriented horizontally in the vehicle, and runs parallel to a vehicle transverse direction. A vertical direction z runs perpendicularly with respect to the longitudinal direction x and perpendicularly with respect to the transverse direction y. In the case of a vehicle seat 1 which is installed in the vehicle, the vertical direction z runs parallel to the vehicle vertical axis.

The positional and directional information used, such as front, rear, top and bottom, relates to a viewing direction of an occupant seated in the vehicle seat 1 in a normal seated position, the vehicle seat 1 being installed in the vehicle, being in a use position suitable for passenger transport with an upright backrest 4, and being oriented in the travel direction as is customary. The vehicle seat 1 according to the invention can also be installed in a different orientation, however, for example transversely with respect to the travel direction.

The vehicle seat 1 for a motor vehicle has a seat part 2 and a backrest 4 with an adjustable inclination relative to the seat part 2. At least the seat part 2 or the backrest 4 has a frame 6 as loadbearing structure. The frame 6 can be manufactured from steel sheet parts. In the present case, the backrest 4 has a frame 6. The frame 6 comprises at least one frame side part 10, in the present case two frame side parts 10 which lie opposite one another in the transverse direction y. The two frame side parts 10 are preferably configured symmetrically, in particular mirror-symmetrically, with respect to a center plane of the vehicle seat, which center plane is oriented perpendicularly with respect to the transverse direction y. The frame side part 10 has a stamped portion 20 for fastening a gas pressure generator 40 which is shown in FIG. 6. The gas pressure generator 40 is usually a constituent part of an assembly, what is known as an airbag module, and, furthermore, is connected to an airbag before mounting on the vehicle seat. When mounting of the gas pressure generator 40 is described in the following text, this likewise relates to mounting of an assembly or an airbag module which has the gas pressure generator 40.

FIG. 2 shows a perspective illustration of the frame 6 of the backrest 4. As viewed in each case in the longitudinal direction x, the frame 6 has a left hand and right hand frame side part 10. The two frame side parts 10 are connected to in each case one upper and lower crossmember 8. FIG. 3 shows a side view of an outer side 14 of the left hand (as viewed in the longitudinal direction x) frame side part 10 of the frame 6. FIG. 4 shows a perspective view obliquely from above of the left hand frame side part 10.

The stamped portion 20 comprises a first section 22a and a second section 22b which is adjacent with respect to the first section 22a. The first section 22a and the second section 22b of the stamped portion 20 are stamped inward and stamped outward, respectively, in an opposed direction substantially parallel to the transverse direction y. The first section 22a is stamped inward relative to the frame 6. The second section 22b is stamped outward relative to the frame 6. A passage opening 24 is arranged in a transition region between the first section 22a of the stamped portion 20 and the second section 22b of the stamped portion 20. The gas pressure generator 40 can be guided partially through said passage opening 24.

The stamped portion 20 has at least a width b so as to receive the gas pressure generator 40 at least partially in the stamped portion 20. In the case of gas pressure generators 40 of round cross section, the passage opening 24 has at least one opening with a diameter corresponding to the width b. The first section 22a and the second section 22b preferably in each case have at least a depth in the range of half the width b.

Furthermore, a plurality of through bores 26, in the present case three through bores 26, are arranged next to one another parallel to a longitudinal extent of the stamped portion 20 in the region of the first section 22a. FIG. 5 shows details of an enlarged illustration of an inner side 12 of the frame side part 10 in the region of the through bores 26. The plurality of through bores 26 serve to position the gas pressure generator 40 relative to the frame side part 10. In addition, it is made possible for various gas pressure generators 40 with a different length a to be used. The through bores 26 are bordered in each case by a flattened region 28 which is preferably annular. Said flattened region 28 makes a full-area introduction of force for fastening of the gas pressure generator 40 possible.

FIG. 6 shows the gas pressure generator 40. The gas pressure generator 40 has a threaded bolt 48 which projects perpendicularly from a housing 42 of the gas pressure generator 40. The gas pressure generator 40 has a gas guide plate 44 which is fixed on the housing 42 and by means of which gas which flows out can be guided in a predefined flow direction. On a side which lies opposite the gas guide plate 44, the gas pressure generator 40 has a multiplicity of gas outlet openings 46, through which the released gas can escape. A plug-in connection for connecting a triggering controller is provided on an end section of the gas pressure generator 40, which end section is remote from the threaded bolt 48.

FIGS. 7 and 8 correspond substantially to the illustrations of FIGS. 2 and 3, with the difference that the gas pressure generator 40 is mounted. FIG. 9 shows an inner side 12 of the frame side part 10 with the mounted gas pressure generator 40. In the mounted state, the gas pressure generator 40 is fastened to the frame side part 10 by means of the threaded bolt 48 which is guided through one of the through bores 26. As is shown in FIG. 10, the threaded bolt 48 of the gas pressure generator 40 is fixed on the frame side part 10 by means of a nut 60 to this end. The nut 60 is screwed onto the threaded bolt 48 from that side of the frame side part 10 which lies opposite the gas pressure generator 40. Here, the nut 60 bears with its full surface against the flattened region 28 which is arranged around the through bore 26.

The features which are disclosed in the above description, the claims and the drawings can be of significance both individually and in combination for the implementation of the invention in its various refinements.

Although the invention has been described in detail in the drawings and the preceding description, the descriptions are to be understood to be illustrative and exemplary and not restrictive. In particular, the selection of the proportions shown in the drawings of the individual elements is not to be interpreted as required or restrictive. Furthermore, in particular, the invention is not restricted to the exemplary embodiments which are described. Further variants of the invention and its implementation result for a person skilled in the art from the preceding disclosure, the figures and the claims.

Terms which are used in the claims such as "comprise", "have", "contain", "consist of" and the like do not rule out further elements or steps. The use of the indefinite article does not rule out a plural. An individual device can carry out the functions of a plurality of units or devices mentioned in the claims.

LIST OF DESIGNATIONS

1 Vehicle seat
2 Seat part
4 Backrest
6 Frame
8 Crossmember
10 Frame side part
12 Inner side
14 Outer side
20 Stamped portion
22a First section
22b Second section
24 Passage opening
26 Through bore
28 Flattened region
40 Gas pressure generator
42 Housing
44 Gas guide plate
46 Gas outlet opening
48 Threaded bolt
60 Nut
a Length
b Width
x Longitudinal direction
y Transverse direction
z Vertical direction

The invention claimed is:

1. A vehicle seat, having a seat part and a backrest, at least the seat part or the backrest having a frame, the frame comprising at least one frame side part, wherein the frame side part has a stamped portion for fastening a gas pressure generator for an airbag;
   wherein the stamped portion comprises a first section and a second section which is adjacent with respect to the first section,
   further comprising a passage opening arranged in a transition region between the first section of the stamped portion and the second section of the stamped portion.

2. The vehicle seat as claimed in claim 1, wherein the first section and the second section of the stamped portion are stamped inward and stamped outward, respectively, in an opposed direction substantially parallel to the transverse direction.

3. The vehicle seat as claimed in claim 1, wherein the first section is stamped in the direction of a frame interior.

4. The vehicle seat as claimed in claim 1, wherein the second section is stamped in the direction of a frame exterior.

5. The vehicle seat as claimed in claim 1, wherein at least one through bore is arranged in the region of the first section.

6. The vehicle seat as claimed in claim 1, further comprising a plurality of through bores being arranged next to one another parallel to a longitudinal extent of the stamped portion in the region of the first section.

7. The vehicle seat as claimed in claim 6, wherein the plurality of through bores position the gas pressure generator relative to the frame side part.

8. The vehicle seat as claimed in claim 6, wherein the plurality of through bores are adapted to make the use of gas pressure generators of different length possible.

9. The vehicle seat as claimed in claim 8, wherein the gas pressure generator comprises a threaded bolt which projects from a housing of the gas pressure generator to fasten the gas pressure generator to the frame side part.

10. The vehicle seat as claimed in claim 9, wherein, in the mounted state, the gas pressure generator is fastened to the frame side part via of the threaded bolt which is guided through at least one of the through bores.

11. The vehicle seat as claimed in claim 9, wherein the threaded bolt of the gas pressure generator is fixed on the frame side part by a nut.

12. The vehicle seat as claimed in claim 1, wherein the stamped portion has at least a width for inserting the gas pressure generator at least partially into the stamped portion.

13. The vehicle seat as claimed in claim 1, wherein the vehicle seat is arranged in the back of a vehicle.

* * * * *